Figure 1:
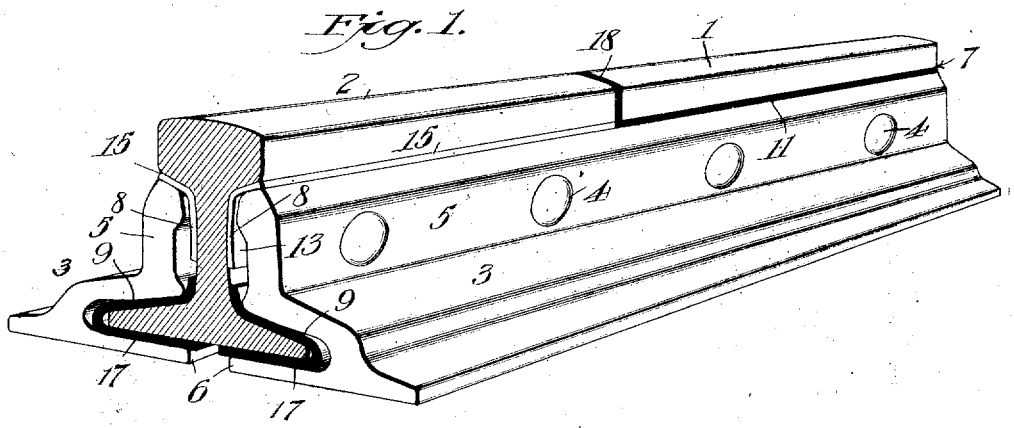

E. F. SCHERMERHORN.

INSULATED RAIL JOINT.

APPLICATION FILED MAY 1, 1913.

Reissued June 10. 1913

13,575.

2 SHEETS—SHEET 1.

Inventor

Edwards F. Schermerhorn

Witnesses

T. L. Moscrop

Harry B. Rook.

By L. P. Wilkinson

Attorney

E. F. SCHERMERHORN.
INSULATED RAIL JOINT.
APPLICATION FILED MAY 1, 1913.
Reissued June 10, 1913.
13,575.
2 SHEETS—SHEET 2.
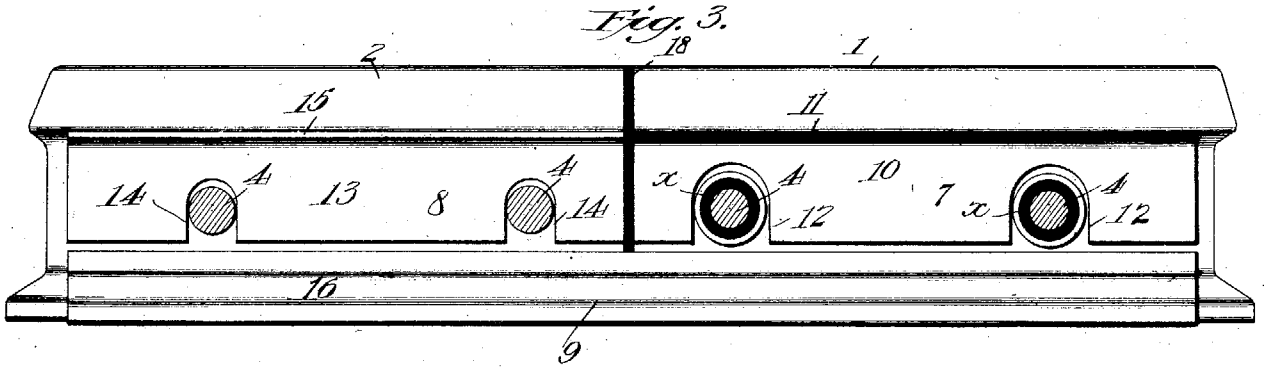
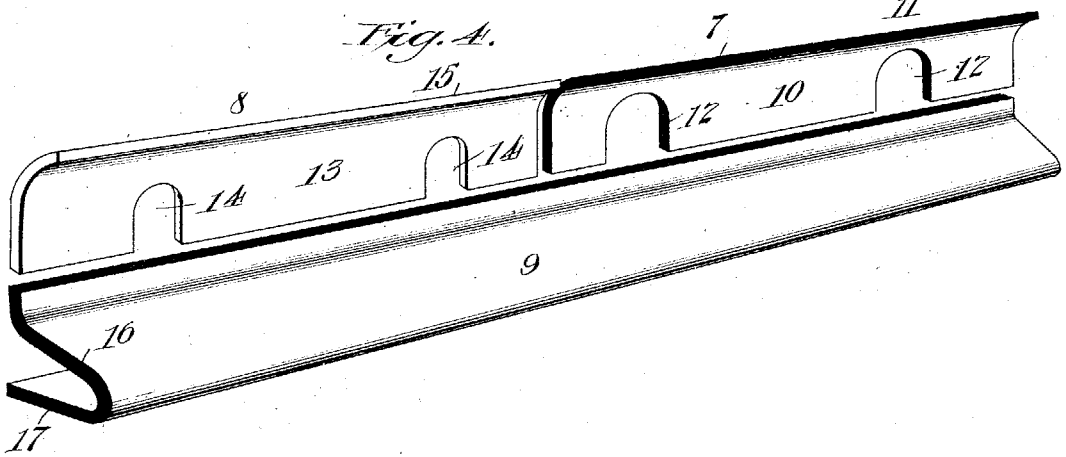
Witnesses
T. L. Moschbee
Harry B. Rook
Inventor
Edwards F. Schermerhorn,
By L. O. Wakeman
Attorney

UNITED STATES PATENT OFFICE.

EDWARDS F. SCHERMERHORN, OF BROOKLYN, NEW YORK, ASSIGNOR TO THE RAIL JOINT COMPANY, OF NEW YORK, N. Y., A CORPORATION OF NEW YORK.

INSULATED RAIL-JOINT.

13,575. Specification of Reissued Letters Patent. Reissued June 10, 1913.

Original No. 1,006,597, dated October 24, 1911, Serial No. 629,560. Application for reissue filed May 1, 1913. Serial No. 764,962.

*To all whom it may concern:*

Be it known that I, EDWARDS F. SCHERMERHORN, a citizen of the United States, residing at Brooklyn, in the county of Kings and State of New York, have invented certain new and useful Improvements in Insulated Rail-Joints, of which the following is a specification.

This invention relates to rail joints of the insulated type and has special reference to an improvement in the means for insulating joints of this character, whereby a minimum amount of insulating material may be utilized to the best advantage, both electrically and mechanically.

The invention generally has in view the provision of means for effectually insulating rail joints with a minimum amount of insulating material while at the same time admitting of the ready removal and replacing of worn-out portions of the insulation without disturbing or affecting the remaining good or unworn insulation, thus involving economical conditions for maintenance and repair.

More particularly, the invention has in view an improvement in sectional insulation for rail joints that will overcome the objections to those types of insulated joints in which there is a tendency for the insulation or fiber under the head of the rail to break and cut out.

It is well known that the insulating material, of an insulated rail joint, usually wears out first under the head of the receiving rail, and the tearing and crushing out of the fiber is soon communicated to that portion under the head of the leaving rail, so it is therefore one of the special objects of the invention to relieve this condition and thus secure a greater life for the insulation under the head of the rail. In this connection, it is also the purpose and object of the invention to provide a novel and practical construction and arrangement of the insulating material, in combination with metal filler pieces, which produces an insulated rail joint having a distinct advantage over similar joints in the particulars of simplicity and cheapness of manufacture, simplicity of installation and renewals of the insulation, an improved fit of joint parts, and uniformity of flexibility throughout the joint, as will hereinafter be more particularly referred to and pointed out in connection with the special features of construction claimed herein.

With these and other objects in view, which will be readily apparent to those familiar with the art as the nature of the invention is better understood, the same consists in the novel construction, combination, and arrangement of parts hereinafter more fully described, illustrated, and claimed.

The essential features of the invention are necessarily susceptible of structural modification, and to application to various kinds of joints without departing from the scope thereof, but a preferred embodiment of the same is shown in the accompanying drawings, in which—

Figure 2:
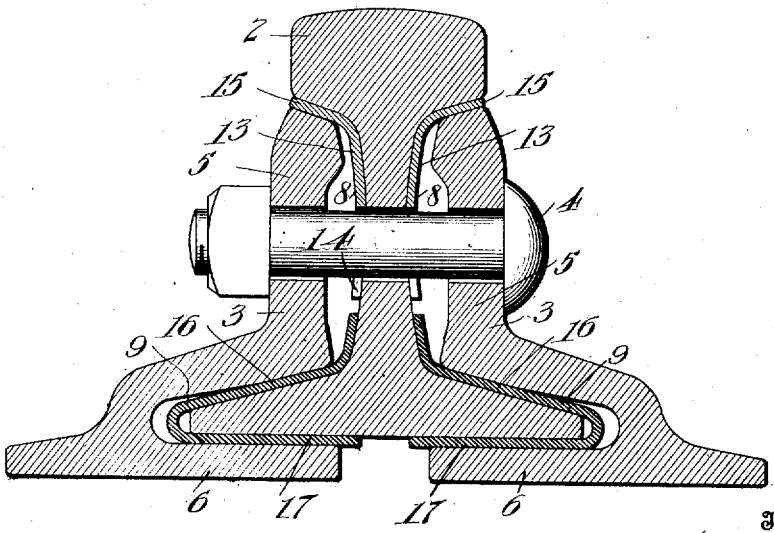

Figure 1 is a sectional perspective view of an insulated rail joint, of the continuous type, showing the joint equipped according to the present invention. Fig. 2 is a vertical cross sectional view through that end of the joint fitted with the metal fillers beneath the head of the receiving rail. Fig. 3 is a side elevation of the joint, with the joint bar removed to expose the sections of insulation, and the metal filler at that side. Fig. 4 is a detail perspective view of the complete equipment for one side of the joint, such equipment including a base section of insulation for the full length of the joint, an upper detachable section of insulation for one of the rails, and an upper detachable metal filler piece for the other rail.

Like references designate corresponding parts in the several figures of the drawings.

The improved insulation expedients forming the subject matter of this application are intended to be applicable to various kinds of rail joints, and hence available for use with fish plates, angle bars, channel bars, or any of the divers forms of splices which extend across the joint between the meeting ends of the rails, but as the invention possesses special utility as an insulating means for rail joints of the continuous type, such type of joint is shown in the drawings for illustrative purposes.

Referring particularly to the drawings, the continuous joint shown therein embodies the well known conventional elements, namely: the service rails 1 and 2, the opposite joint bars 3, and the usual joint bolts 4. The joint bars 3 being of the usual continuous design, consist of the angle bar members 5 fitting the fishing spaces of the rails, and the horizontal inwardly extending rail supporting base sections 6 which are integral with the angle bar members 5 and form therewith the usual continuous flange-receiving spaces or pockets for the flanges of the rails. Therefore, joint bars of this type engage beneath the heads of the rails, overlie the rail flanges, and also underlie the bottom surfaces of the rails.

According to the present invention, it is proposed to provide what may be termed a modified one-end insulation wherein insulating material is only applied to one rail end beneath the head thereof, and other insulation is applied to the flanges of both rail ends and acts as a base insulation for the joint that extends the full length thereof. The rail end that is not provided with insulation beneath the head thereof is fitted with compensating metal filler pieces. Hence, the present invention includes as the essential and distinctive feature thereof an upper detachable section of insulation 7 arranged at each side of one of the rail ends, designated in the drawings by the numeral 1, an upper detachable metal filler piece 8 arranged at each side of the other rail end designated by the numeral 2, and a base section of insulation 9 arranged at each side of the joint and fitting the base flanges of both rails, said base section of insulation extending the full length of the joint. Each upper section of insulation 7 is made of the usual fiber sheet or of other insulating material, and is provided with a web portion 10 lying next to the web of the rail, and with an upper flange portion 11 interposed between the upper edge of the joint bar and the under side of the rail head. This upper section of insulation 7, for one rail end, is intended to be arranged above the line of joint bolts and is removable and insertible when such bolts are sufficiently loosened, and to prevent endwise creeping or displacement, each section of insulation 7 is provided in its web portion 10 with open keeper notches or slots 12 that engage over the bolts 4. The metal filler pieces 8 for the other rail 2 are substantially the same in thickness, dimensions, and construction as the sections of insulation 7. Accordingly, in the matter of construction each filler piece 8 is provided with a web portion 13 having open keeper notches or slots 14 to engage over the bolts, and an upper flange 15 which is interposed between the under sides of the rail heads and the upper edges of the joint bars. Each base section of insulation 9 is in the form of an insulating cuff having an upper inclined member 16 lying between the joint bar and the upper faces of the rail flanges, and a bottom horizontal base section 17 interposed between the base sections 6 of the joint bars and the bottoms of both rails. To complete the insulation of the joint, the usual insulating end post 18 is placed between the rail ends, and the joint bolts for that end of the joint having the sections of insulation 7 are provided with any of the well known or conventional bolt insulating expedients such as indicated at X on Fig. 3.

In equipping a rail joint with the insulation herein described, it is proposed that the upper sections of insulation 7 shall be placed beneath the head of the "leaving rail" 1, while the metal fillers 8 are placed beneath the head of the "receiving rail" 2. It will also be observed that the elements 7 and 8 are entirely separate from each other and arranged above the line of bolts, while the base pieces 9 are likewise separate elements and are arranged wholly below the line of bolts.

The novel arrangement and construction of the parts described possess several advantageous features by reason of employing sections of insulation under the head of the "leaving rail", metal fillers under the head of the "receiving rail", and continuous lengths of base-insulation for the rail flanges. In the first place, by substituting metal for fiber under the head of the "receiving rail", the fiber is relieved of its severest service, and that under the head of the "leaving rail" will have a greater life than at present on account of not being subjected to tearing and chafing at the junction of the rail ends. It has also been pointed out that the construction described simplifies and cheapens the manufacture of the joint, and this is due to the fact that if a metal filler were used adjacent to the base of the rail, it would require the slow and relatively costly method of producing a die to form the filler for some types of joint. Also, the present invention simplifies the installation and renewal of the insulation for the reason that in the type of joint described the base fiber or insulation outwears the head fiber many times over, and to renew the joint insulation only requires the loosening of the bolts and replacing the two sections of insulation for the head of one rail only, thus decreasing the insulation renewal to a minimum. Furthermore, it will be understood that where a metal filler is used on one end of the joint, in a one-end insulated joint, to compensate for fiber on the other end, it is difficul to secure metal and fiber of exactly the sa thickness or gage, owing to variations in iber. Consequently, if the thickness of metal and fiber varies, the fit of the joint bars will not be uniform, which is of extreme importance in insulated joints, as a poor fit results in rapid destruction of the fiber. This is obviated in the present invention by employing a base insulation or base piece for the rail flanges that extends the whole length of the joint.

At the same time, by having this base insulation extend over the flanges of both rails, as in the present case, the compressible material is more equally distributed with the result that the excessive stiffness at the metal filled end of the joint is relieved so that this end of the joint (receiving end) becomes less of an anvil under the shock of wheel-blows, and the rail head of the "receiving rail" and the fiber on the "leaving end" are protected against excessive wear.

While special stress has been placed on the specific and preferred embodiment of the invention shown in the drawings, it will be understood by those familiar with the art that the essential features of the invention may be preserved with a staggered insulation of the joint, that is, with the fiber and metal head-pieces arranged in opposite and alternate relation, one fiber head-piece and one metal head-piece for each rail, and the continuous base-flange insulation remaining the same. Other equivalent modifications may be resorted to without departing from the principle or sacrificing any of the advantages of the invention.

I claim:

1. In an insulated rail joint, the rail ends, the joint bars, rail-head insulation for one of the rails, compensating metal fillers for the head of the other rail, and a base section of insulation for the rail flanges extending over both rail ends.

2. An insulated rail joint having head insulation for its leaving rail, corresponding metal fillers for the head of its receiving rail, and a base insulation for the rail flanges that extends the full length of the joint.

3. In an insulated rail joint, the rail ends, the joint bars, rail-head insulation for the leaving rail, compensating metal fillers for the head of the receiving rail, and base insulation for the rail flanges, separate from said other insulation and said metal fillers, and extending the full length of the joint.

4. In an insulated rail joint, the rail ends, the joint bars, upper sections of insulation arranged under the head of one rail, corresponding upper metal fillers arranged under the head of the other rail, and separate base insulation for the rail flanges extending over both rail ends.

5. In an insulated rail joint, the rail ends, the joint bars, upper sections of insulation disposed above the line of joint bolts and arranged under the head of one rail, corresponding upper metal fillers disposed above the joint bolts and arranged under the head of the other rail, and separate base insulation for the rail flanges disposed below the joint bolts and extending over both rail ends.

6. In an insulated rail joint, the rail ends, the joint bars, upper detachable sections of insulation arranged under the head of one rail, corresponding upper detachable metal fillers arranged under the head of the other rail, and separate base insulation for the rail flanges extending over both rails.

7. In an insulated rail joint, the rail ends, the joint bars, upper detachable sections of insulation arranged under the head of one rail and interlocked with the joint bolts, corresponding upper metal fillers arranged under the head of the other rail, and interlocked with the joint bolts, and separate base sections of insulation embracing the rail flanges of both rails.

8. In an insulated rail joint, the rail ends, the joint bars, an upper section of insulation arranged under the head of one rail, a corresponding upper metal filler arranged under the head of the other rail, and a separate base insulation for the rail flanges extending over both rail ends.

9. An insulated rail joint having splice bars, rail head insulation between one rail head and one splice bar, and a compensating metal filler between the other rail head and said splice bar, and base insulation for the flanges of both rails.

10. An insulated rail joint including the rails, a joint bar, a metal filler between one rail and said joint bar, and insulation for the bar including a head section between the bar and the other rail, and a base section for the flanges of both rails.

11. An insulated rail joint including in combination with the rails, a joint bar which is in electrical contact with the head of one rail and having an electrically insulated bearing beneath the head of the other rail, and an electrical insulation interposed between said bar and the rail flanges.

12. An insulated rail joint including in combination with the rails, a joint bar having an electrical bearing contact with the head of one rail, and having an electrically insulated bearing with the head of the other rail and electrical base insulation extending under both rails.

13. An insulated rail joint including in combination with the rails, a joint bar having an electrical bearing contact with the head of one rail, and having an electrical insulated bearing with the head of the other rail, and electrical insulation for the bases of both rails.

In testimony whereof I hereunto affix my signature in the presence of two witnesses.

EDWARDS F. SCHERMERHORN.

Witnesses:

BENJA. WOLHAUPTER,

KATHERINE McNALLY.